United States Patent
Bugg

(10) Patent No.: US 9,511,311 B2
(45) Date of Patent: Dec. 6, 2016

(54) FILTRATION TANK WITH SERIALLY CONNECTED HORIZONTAL SCREENS

(75) Inventor: Peter J. Bugg, Caledonia, IL (US)

(73) Assignee: Ovivo Inc., Montreal, Quebec (CA)

( * ) Notice: Subject to any disclaimer, the term of this patent is extended or adjusted under 35 U.S.C. 154(b) by 1025 days.

(21) Appl. No.: 13/213,603

(22) Filed: Aug. 19, 2011

(65) Prior Publication Data
US 2013/0043179 A1 Feb. 21, 2013

(51) Int. Cl.
| | | |
|---|---|---|
| C02F 1/00 | (2006.01) | |
| B01D 33/06 | (2006.01) | |
| B01D 35/16 | (2006.01) | |
| B01D 33/073 | (2006.01) | |
| B01D 33/067 | (2006.01) | |
| B01D 33/11 | (2006.01) | |
| B01D 33/42 | (2006.01) | |
| B01D 33/50 | (2006.01) | |

(52) U.S. Cl.
CPC ........... *B01D 33/073* (2013.01); *B01D 33/067* (2013.01); *B01D 33/11* (2013.01); *B01D 33/42* (2013.01); *B01D 33/50* (2013.01); *C02F 1/001* (2013.01); *C02F 2303/16* (2013.01)

(58) Field of Classification Search
CPC ..... B01D 33/067; B01D 33/073; B01D 33/11; B01D 33/42; B01D 33/50; B01D 33/41; B01D 33/0016; B01D 24/008; B01D 24/08; B01D 2201/287; B01D 33/00; B01D 33/0064; C02F 1/001; C02F 2303/16
USPC .................................................. 210/324, 446
See application file for complete search history.

(56) References Cited

U.S. PATENT DOCUMENTS

| | | | | |
|---|---|---|---|---|
| 47,261 | A | * | 4/1865 | Simmons ....................... 210/284 |
| 2,798,609 | A | * | 7/1957 | Smith .................. B01D 33/067 |
| | | | | 210/403 |
| 3,349,916 | A | * | 10/1967 | Magson ............. B01D 33/0009 |
| | | | | 210/143 |
| 3,510,002 | A | * | 5/1970 | Evans ........................... 210/232 |
| 3,661,262 | A | * | 5/1972 | Sanders ................... 210/167.22 |
| 3,679,035 | A | * | 7/1972 | Schmitt ..................... 192/129 A |
| 3,956,127 | A | * | 5/1976 | Holmberg ........... B01F 3/04588 |
| | | | | 210/150 |
| 4,038,187 | A | * | 7/1977 | Saffran ......................... 210/108 |
| RE29,970 | E | * | 4/1979 | Torpey .................... C02F 3/082 |
| | | | | 210/619 |
| 4,200,532 | A | * | 4/1980 | Iwatani .................... B01J 19/30 |
| | | | | 210/151 |
| 4,222,754 | A | * | 9/1980 | Horvat ........................... 55/283 |
| 4,236,999 | A | * | 12/1980 | Burgess et al. .............. 209/240 |
| 4,532,035 | A | * | 7/1985 | Fuchs ..................... C02F 3/082 |
| | | | | 210/150 |

(Continued)

*Primary Examiner* — Bobby Ramdhanie
*Assistant Examiner* — Denise R Anderson
(74) *Attorney, Agent, or Firm* — James Earl Lowe, Jr.

(57) ABSTRACT

A wastewater filtration device, the device including a tank having end walls, a first screen rotationally mounted adjacent one tank end wall, and a second screen rotationally mounted adjacent the other tank end wall, adjacent the fine screen. The device further includes an inlet in one end wall adjacent the fine screen and into the fine screen, and an outlet in the other end wall adjacent the second screen and out of the second screen. A dividing wall is between the first screen and the second screen, so that water in the inlet flows into the first screen, and then through the first screen out into the tank, around the dividing wall, and then through the second screen into the outlet.

16 Claims, 7 Drawing Sheets

(56) References Cited

U.S. PATENT DOCUMENTS

| | | | | |
|---|---|---|---|---|
| 4,647,375 A | * | 3/1987 | Czeller et al. | 210/267 |
| 4,729,828 A | * | 3/1988 | Miller | C02F 3/082 |
| | | | | 210/150 |
| 5,433,849 A | * | 7/1995 | Zittel | B01D 33/11 |
| | | | | 209/290 |
| 2006/0213834 A1 | * | 9/2006 | Kando | B01D 65/02 |
| | | | | 210/636 |

* cited by examiner

FILTRATION TANK WITH SERIALLY CONNECTED HORIZONTAL SCREENS

BACKGROUND

This disclosure is directed to a filtration device including a first screen and then a second screen, and, more particularly, to a device for screening wastewater.

Wastewater treatment technologies have continued to advance, increasing the use of Membrane Biological Reactors (MBR's). These MBR systems are very susceptible to fouling, which has increased the level of pre-screening requirements. Fine screens of ¼" (6 mm) slots or aperture have not proven to provide adequate screening for many membrane systems. The trend has been towards ⅛" (3 mm) and smaller screens. Slotted screens are no longer favorable, as they provide only one dimensional screening. Perforated plates with 2 mm and 1 mm aperture openings are gaining in popularity. Screening to such a fine level presents new challenges, as these screens typically need a larger aperture screen up stream, as the very fine screens become fouled too quickly when used alone. Additionally, screens of 2 mm or smaller aperture are subject to excessive wear unless grit removal equipment is upstream of the screen. Dual stage screening is considered the best defense to protect MBR systems. The problems associated with dual stage screening are primarily the cost and size requirements associated with two screens and separate grit removal equipment.

Several styles of screens can accomplish the task of removing solids from a wastewater stream. Drum screens and center flow band screens have gained considerable popularity for these pre-MBR applications. Because they have a continuous loop of screen elements, the water is forced through the screen, with no escape routes. The removed solids have no way of passing around the screening elements, making their inherent removal efficiencies very high. Drum screens in particular are gaining particular popularity for this application. Some use slots which provide only 1 dimensional screening, but they are relative easy to clean and low on maintenance. Round aperture screens however have proven to provide higher removal efficiencies. Some configurations of drum screens flow into the center of the drum, and out the sides, while others flow from the outside of the drum into the center. Many of these drum screens require a free flowing bottom discharge of water, requiring a pumped flow, and high head loss.

SUMMARY

This disclosure provides a wastewater filtration device, the device including a tank having end walls, a first screen coaxially mounted adjacent one tank end wall, and a second screen coaxially mounted adjacent the other tank end wall, adjacent the fine screen. The device further includes an inlet in one end wall adjacent the fine screen and into the fine screen, and an outlet in the other end wall adjacent the second screen and out of the second screen. A dividing wall is between the first screen and the second screen, so that water in the inlet flows into the first screen, and then through the first screen out into the tank, around the dividing wall, and then through the second screen into the outlet.

In one embodiment, the first screen is a cylindrical fine screen, and the second screen is a cylindrical ultra-fine screen. The cylindrical fine screen and the cylindrical ultra-fine screen are coaxially mounted on the longitudinal axis. The device also including means for rotating the screens comprising a motor attached of one of the screens.

In one embodiment, the device includes a fine screen cleaning spray comprising a pipe extending spaced from but parallel to the longitudinal axis, and outside of the fine screen, with spray nozzles on the pipe directing water into the fine screen. The sprayed water flows through the fine screen and into a trough, so that the water cleans the fine screen and debris is captured in the trough. The device also includes an ultra-fine screen cleaning spray comprising a pipe extending along the longitudinal axis, inside of the ultra-fine screen, with spray nozzles on the pipe directing water into the ultra-fine screen. The sprayed water flows through the ultra-fine screen and into the tank, so that the water cleans the ultra-fine screen and debris is captured in the tank. The screens are supported in the tank by rollers attached to the screens and engaging a flange on it's respective end wall.

Figure 1:
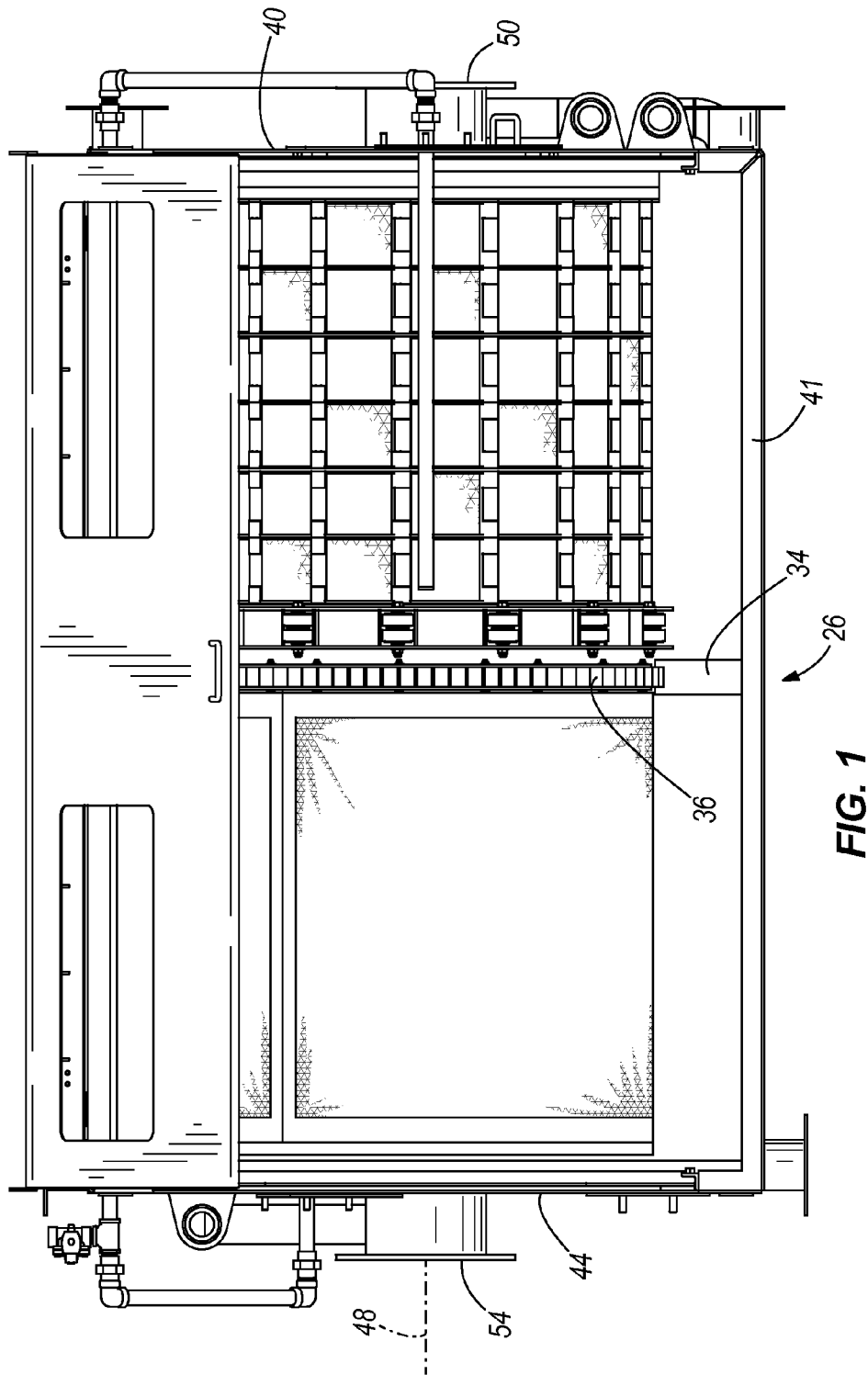
FIG. 1 is a top view of the filtration device according to this disclosure. A cover on a tank is open, exposing a fine screen including plurality of connected screens or plates. And an ultra-fine screen, the fine screen and ultra-fine screen being coaxial and connected to a dividing wall.
Figure 2:
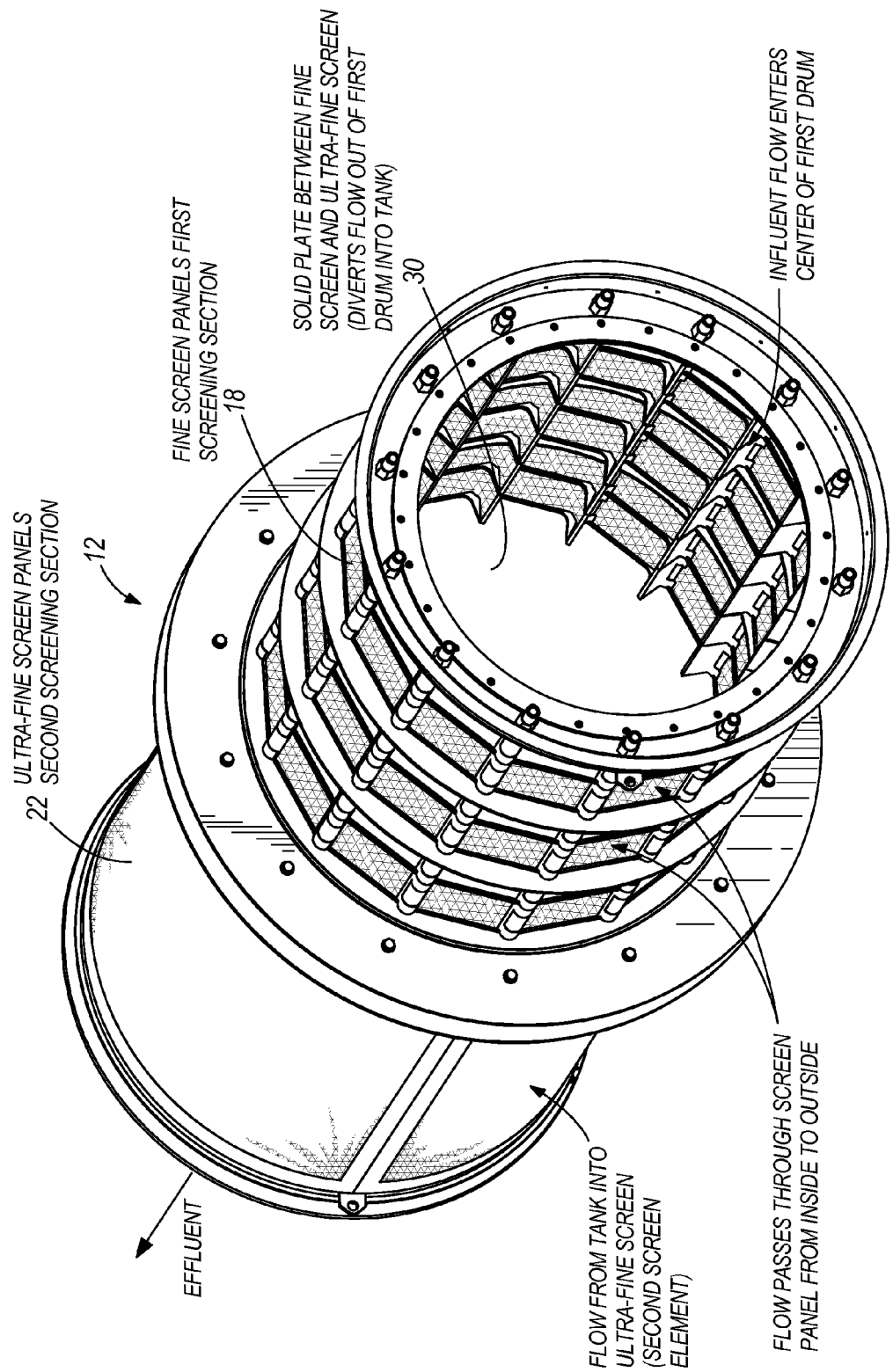
FIG. 2 is a perspective view of the fine screen, the dividing wall, and the ultra-fine screen.

Before one embodiment of the disclosure is explained in detail, it is to be understood that the disclosure is not limited in its application to the details of the construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward", "downward", "side", "top" and "bottom", etc., are words of convenience and are not to be construed as limiting terms.

DESCRIPTION OF THE PREFERRED EMBODIMENT

Figure 3:
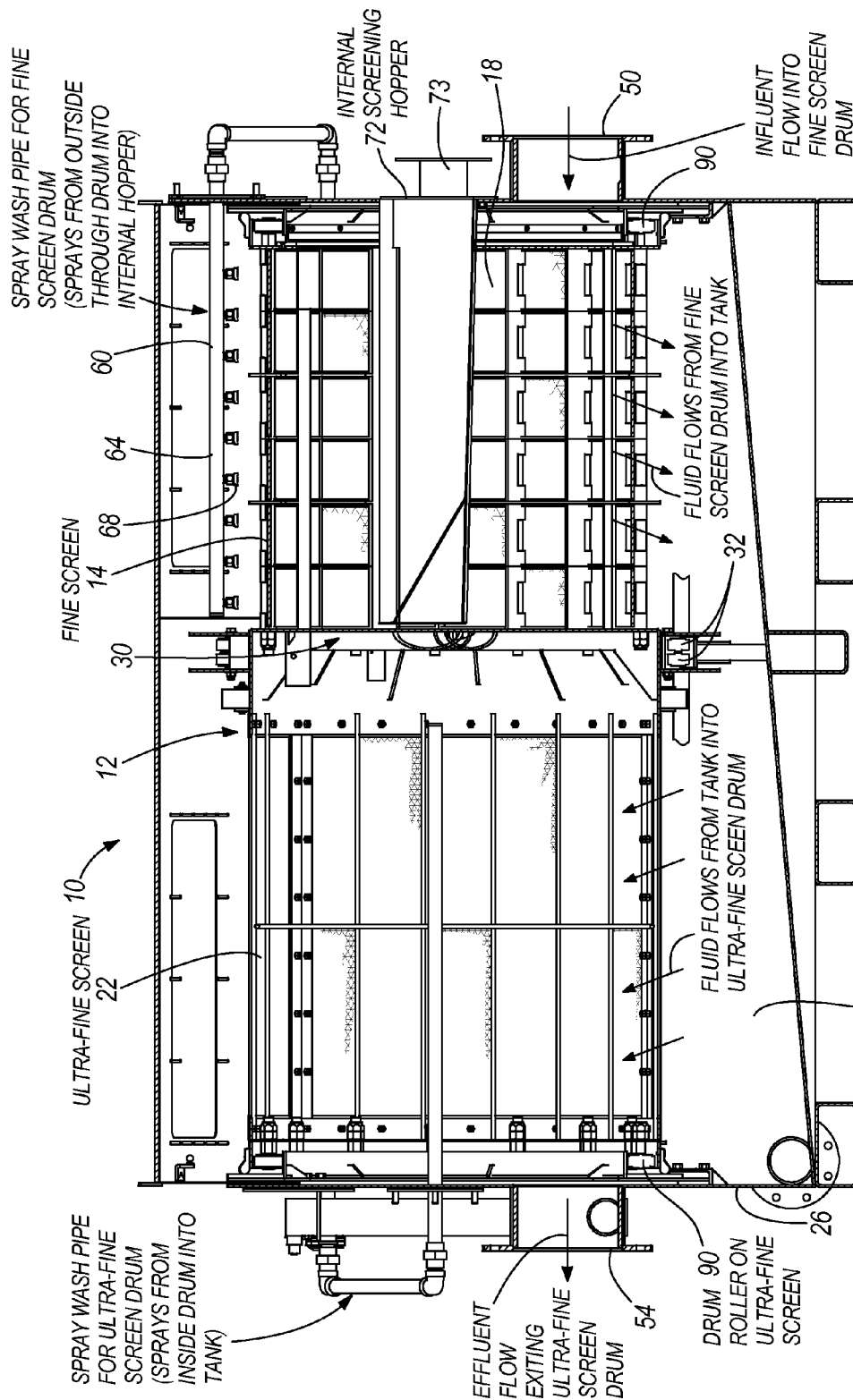
FIG. 3 is a cross sectional front side view of the filtration device shown in FIG. 1.

As illustrated in the drawings, and more particularly in FIG. 3, this disclosure provides a water filtration device 10. The wastewater filtration device 10 has a drum 12 with an entry portion or first screen 14 with 3 mm aperture, connected together tapered hole plates 18 that are easily cleaned with a low-pressure spray. The second half of the drum 12 includes a second screen 22 with a 1 mm square mesh screen material. In other embodiments (not shown), other screen materials and screen sizes can be used. Wastewater flow enters the first screen 14 in its center, out into a tank 26, and then back into the second screen 22 from the outside of the second screen 22, exiting from the center of the second screen 22. The two screens are installed on a single drum, with a dividing wall 30 in the center, utilizing a single drive unit 34 that engages teeth 36 on the dividing wall 30. Optional grit removal equipment (not shown) can be installed in or outside of the tank 26.

Figure 4:
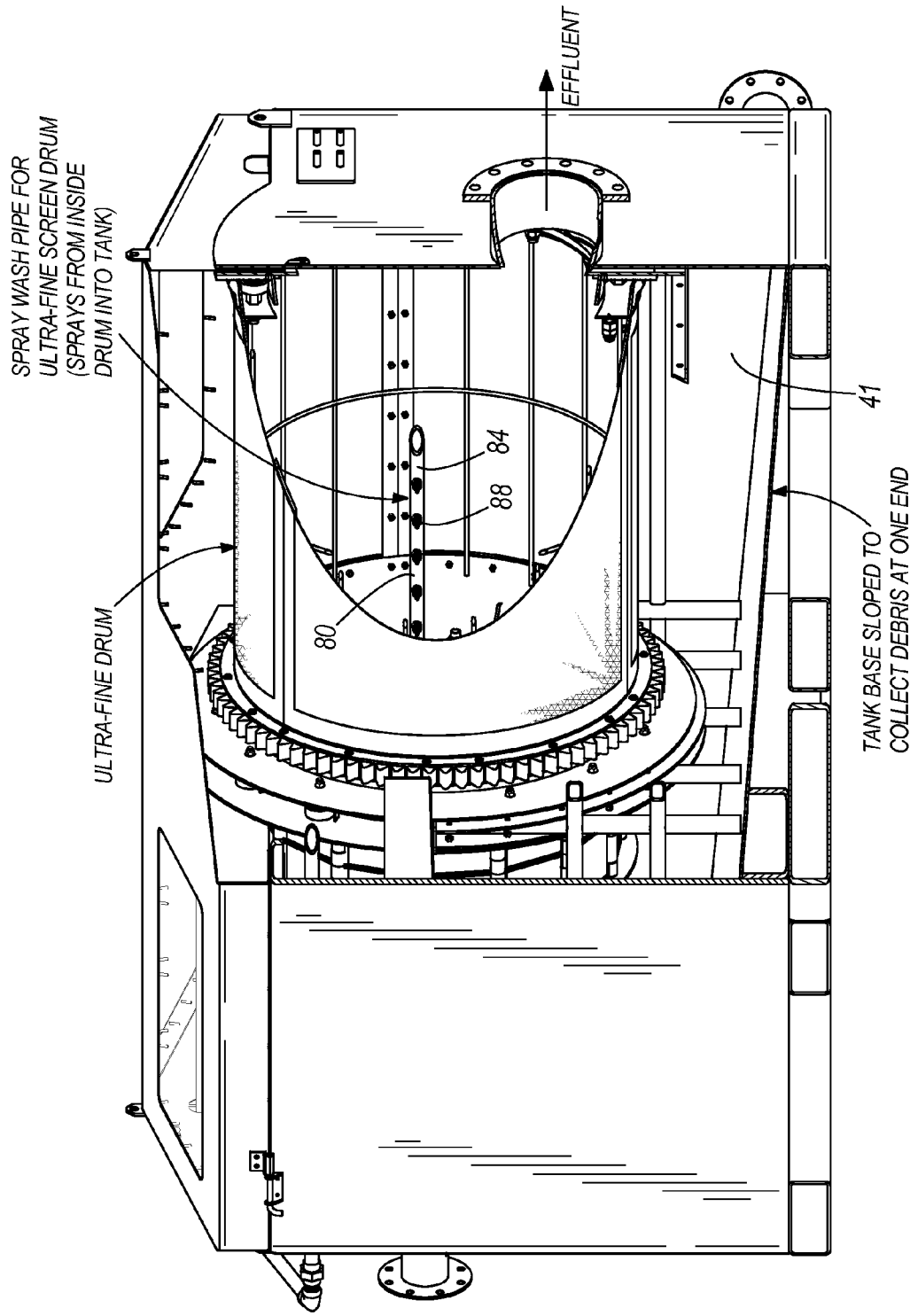
FIG. 4 is a partially broken away rear side view of the filtration device shown in FIG. 1.
Figure 5:
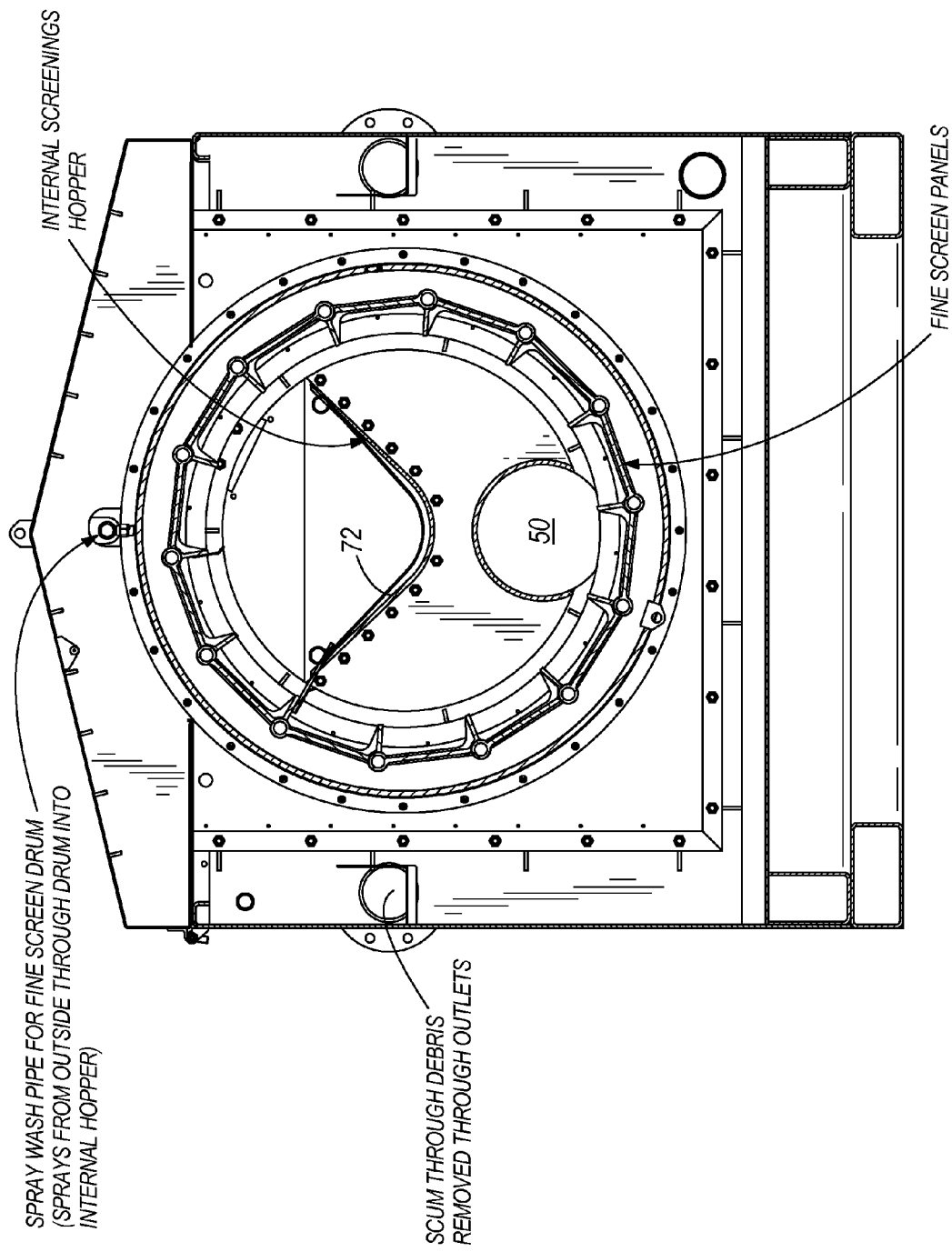
FIG. 5 is a sectional end view of the filtration device shown in FIG. 1.

More particularly, as shown in FIGS. 1, 3 and 4, the filtration device 10 includes the tank 26 having side walls 41 and 43 and end walls 40 and 44, and a longitudinal axis 48 within the tank 26 and extending from one end wall 40 to the other end wall 44. A tank as used herein means any structure that can hold wastewater. For example, in some embodiments (not shown), the tank can be a channel or other civil structure. The first screen 14 is in the form of a cylindrical fine screen rotationally mounted adjacent the one tank end wall 40. The second screen 22 is in the form of an ultra-fine screen rotationally mounted adjacent the other tank end wall 44, adjacent the fine screen 14. An inlet 50 in the one end wall 40 is adjacent the fine screen 14. Wastewater to be screened enters through the inlet 50 and into the inside of the fine screen 14. An outlet 54 is in the other end wall 44, adjacent the ultra-fine screen 22. Screened wastewater from inside the ultra-fine screen 22 passes out the outlet 54.

The dividing wall 30 is between the fine screen 14 and the ultra-fine screen 22, so that wastewater from the inlet 50 flows into the inside of the fine screen 14, and then through the fine screen 14 out into the tank 26, around the dividing wall 30, and then through the ultra-fine screen 22 into the outlet 54. The dividing wall, and thus the drum 12, is supported by rollers 32.

More particularly, the fine screen 14 is connected to one side of the dividing wall 30, and the ultra-fine screen 22 is attached to the other side of the dividing wall 30. And the cylindrical fine screen 14 and the cylindrical ultra-fine screen 22 are coaxially mounted on the longitudinal axis 48.

The filtration device 10 also includes means for rotating said screens. In one embodiment, the means for rotating the screens comprises the drive unit or motor 34. Thus, rotation of the dividing wall 30 rotates both screens. In other embodiments (not shown), said means for rotating can comprise, if the screens are not both connected to the dividing wall 30, separate motors, each connected to a separate screen.

The filtration device 10 also includes, as shown in FIG. 3, means for cleaning the fine screen in the form of a low-pressure fine screen cleaning spray 60. The fine screen cleaning spray 60 comprises a pipe 64 extending spaced from but parallel to the longitudinal axis 48, outside of the fine screen 14, with spray nozzles 68 on the pipe 64 directing water straight downward into the fine screen 14. The sprayed water flowing through the fine screen 14 flows into a trough 72, so that the water cleans the fine screen 14 and debris falls into the trough 72. The mixture of debris and water then flows by gravity from the trough 72 out of the filtration device 10.

The filtration device 10 also includes, as shown in FIG. 4, means for cleaning the ultra-fine screen in the form of a low-pressure ultra-fine screen cleaning spray 80. The ultra-fine screen cleaning spray 80 comprises a pipe 84 extending along the longitudinal axis 48, inside of the ultra-fine screen 22, with spray nozzles 88 on the pipe 84 directing water into the ultra-fine screen 22, the sprayed water flowing through the ultra-fine screen 22 into the tank 26, so that the water cleans the ultra-fine screen 22 and debris is captured in the tank 26.

Figure 6:
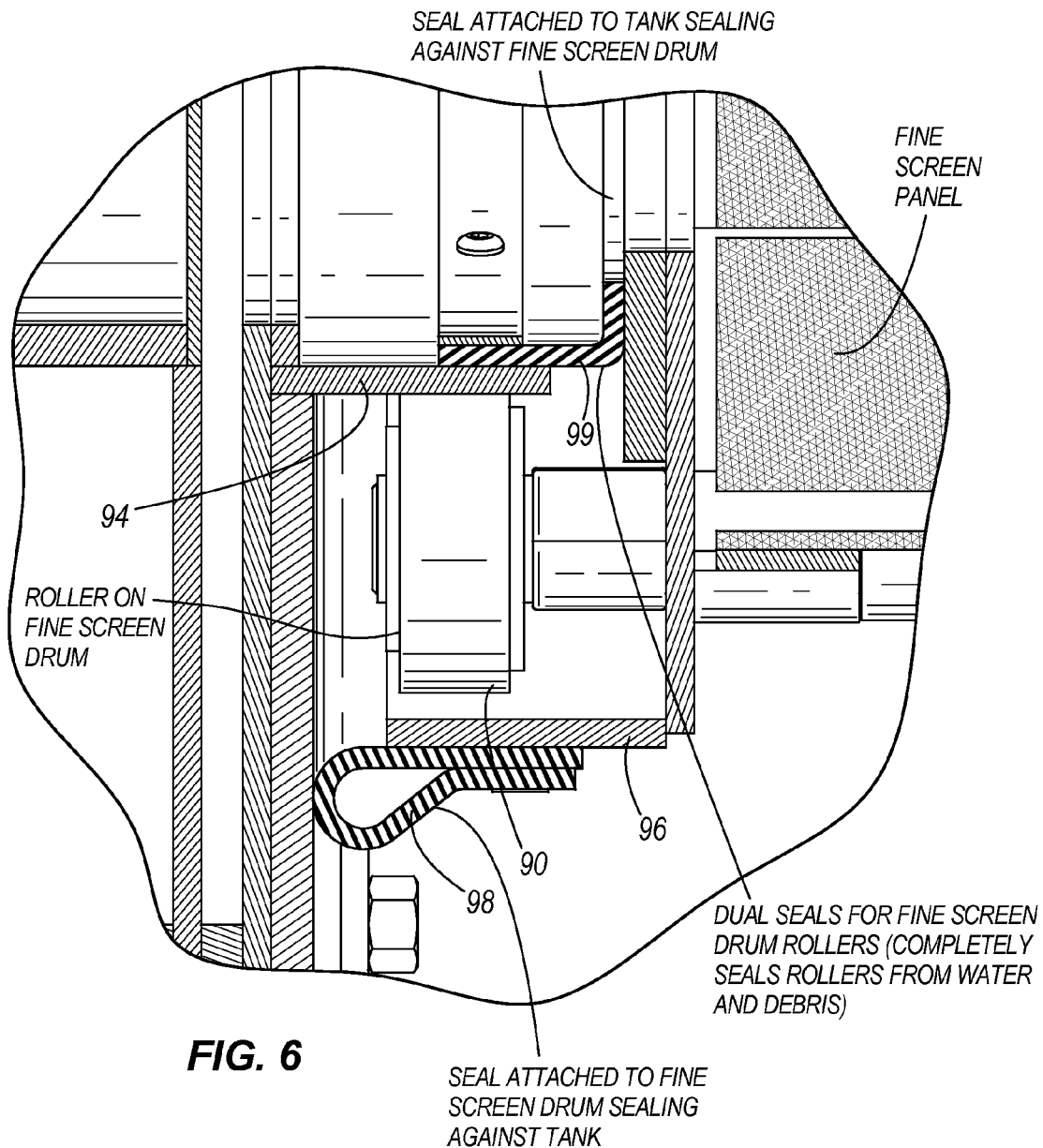
FIG. 6 is an exploded view of a screen supported by a flange attached to a tank end wall by a roller assembly.

As shown in detail in FIG. 6, the screens are supported in the tank by the dividing wall 30, and by rollers 90 attached to the screens and engaging a respective cylindrical flange 94 on the screen's respective end wall. A seal on a cylindrical wall 96 on the screen surrounds the rollers 90, and includes a seal 98 that engages the end wall, thus protecting the rollers 90 from the wastewater. Another seal 99 extending from the screen engages the inside of the cylindrical flange 94 and protects the inside of the flange 94 from wastewater. In other embodiments (not shown), the screens could be supported by a shaft extending between the end walls along the central axis 48.

Figure 7:
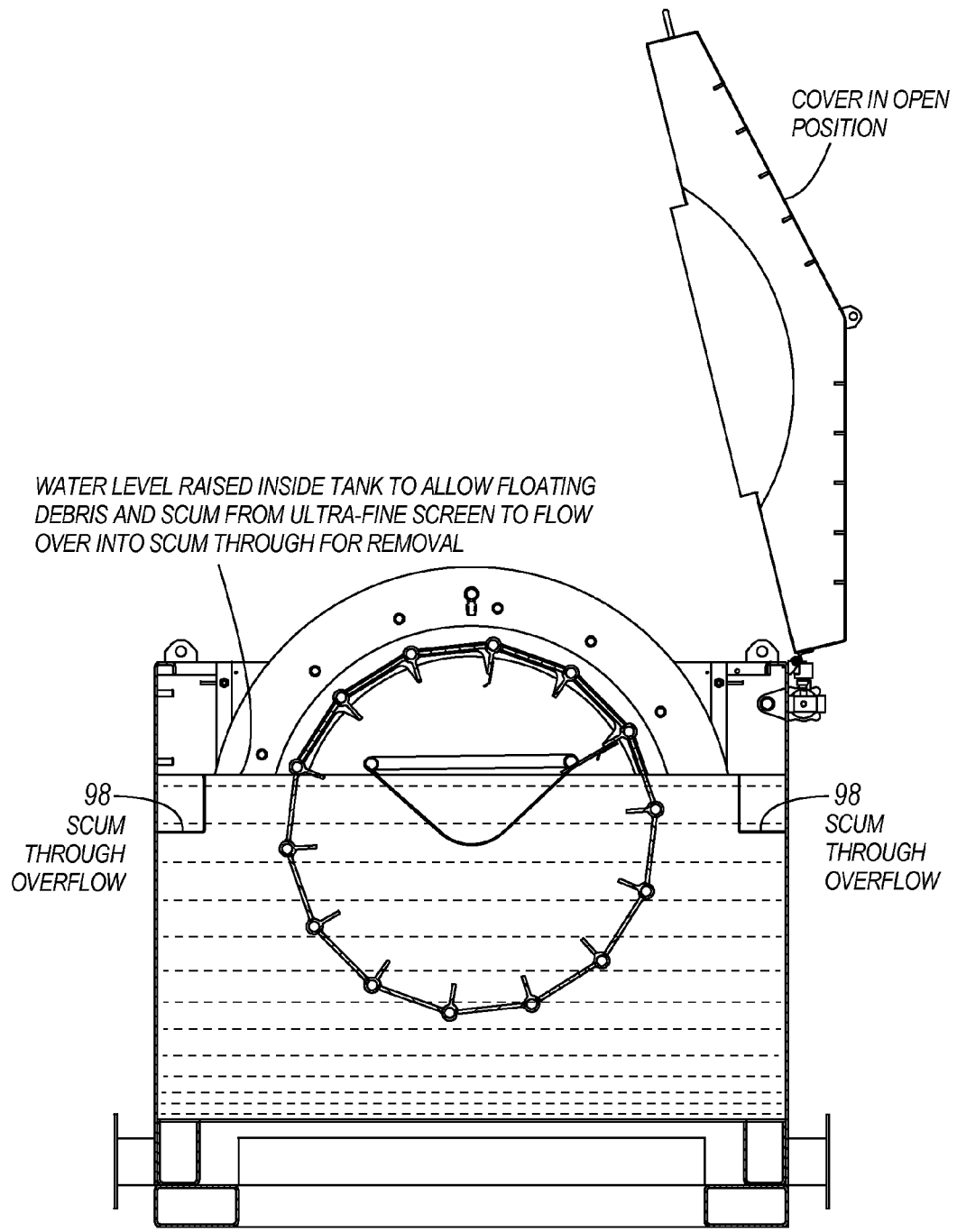
FIG. 7 is an end view of the filtration device shown in FIG. 1, illustrating the water level raised inside the tank to allow floating debris and scum inside the tank to flow over into a scum trough.

As shown in FIG. 7, the outlet 54 from the tank 26 is periodically choked via an automatic valve (not shown) to raise the internal tank water level to the height of scum troughs 98 installed in the tank 26, allowing scum and floatables to be washed out of the scum troughs 98.

The filtration device 10 provides an extremely high level of screenings removal efficiencies in a single driven drum 12 that does not require extra protection upstream, and that operates only with gravity. Additionally, the space requirement is very small, and maintenance is very low compared to other options. Cleaning of the drum 12 is accomplished by use of the low-pressure spray nozzles 68 and 88. The screenings on the entry side of the drum are sprayed into the trough 72 and exit the screen by gravity. Screenings on the second side of the drum 12 are captured on the outside of the drum and washed back into the tank 26. The discharge of the filtration device 10 is periodically choked via an automatic valve to raise the internal tank level to the height of the scum troughs 98 installed in the tank 26, allowing scum and floatables to be washed out of the device 10. Settled solids are periodically pumped from the tank 26.

Various other features of this disclosure are set forth in the following claims.

The invention claimed is:

1. A wastewater filtration device, said device including:
   a tank having end walls,
   a longitudinal axis within said tank and extending from one end wall to said other end wall,
   a first screen rotationally horizontally mounted adjacent one tank end wall,
   a second screen rotationally horizontally mounted adjacent said other tank end wall, adjacent said first screen,
   an inlet in one end wall adjacent said first screen and into said first screen,
   an outlet in the other end wall adjacent said second screen and out of said second screen, and
   a dividing wall between said first screen and said second screen, so that water in said inlet flows into said first screen, and then through said first screen out into said tank, around said dividing wall, and then through said second screen into the outlet.

2. A wastewater filtration device, said device including:
   a tank having end walls,
   a longitudinal axis within said tank and extending from one end wall to said other end wall,
   a cylindrical fine screen rotationally horizontally mounted adjacent one tank end wall,
   a cylindrical ultra-fine screen rotationally horizontally mounted adjacent said other tank end wall, adjacent said fine screen,
   an inlet in one end wall adjacent said fine screen and into said fine screen, an outlet in the other end wall adjacent said ultra-fine screen and out of said ultra-fine screen, and a dividing wall between said fine screen and said ultra-fine screen, so that water in said inlet flows into said fine screen, and then through said fine screen out into said tank, around said dividing wall, and then through said ultra-fine screen into the outlet.

3. A wastewater filtration device in accordance with claim 2 and further including means for rotating said screens.

4. A wastewater filtration device in accordance with claim 2 wherein the fine screen is connected to one side of the dividing wall, and the ultra-fine screen is attached to the other side of the dividing wall.

5. A wastewater filtration device in accordance with claim 2 and further including means for rotating said screens comprising a motor attached of one of said screens.

6. A wastewater filtration device in accordance with claim 2 wherein said cylindrical fine screen and said cylindrical ultra-fine screen are coaxially mounted on said longitudinal axis.

7. A wastewater filtration device in accordance with claim 2 wherein said fine screen comprises a plurality of adjacent plates connected to each other.

8. A wastewater filtration device in accordance with claim 2 wherein said device includes a fine screen cleaning spray, said fine screen cleaning spray comprising a pipe extending spaced from but parallel to said longitudinal axis, and outside of said fine screen, with spray nozzles on said pipe directing water into said fine screen, said sprayed water flowing through said fine screen and into a trough, so that said water cleans said fine screen and debris is captured in said trough.

9. A wastewater filtration device in accordance with claim 2 wherein said device includes an ultra-fine screen cleaning spray, said ultra-fine screen cleaning spray comprising a pipe extending along said longitudinal axis, inside of said ultra-fine screen, with spray nozzles on said pipe directing water into said ultra-fine screen, said sprayed water flowing through said ultra-fine screen and into said tank, so that said water cleans said ultra-fine screen and debris is captured in said tank.

10. A wastewater filtration device in accordance with claim 2 wherein said screens are supported in said tank by rollers attached to said screens, each of the rollers engaging an annular flange on an end wall.

11. A wastewater filtration device in accordance with claim 2 and further including scum troughs mounted within the tank so that said water level can be periodically raised in order to remove scum from said water surface.

12. A wastewater filtration device, said device including:
a tank having end walls,
a longitudinal axis within said tank and extending from one end wall to said other end wall,
a cylindrical fine screen rotationally horizontally mounted on said longitudinal axis adjacent one tank end wall,
a cylindrical ultra-fine screen rotationally horizontally mounted on said longitudinal axis adjacent said other tank end wall, adjacent said fine screen,
an inlet in one end wall adjacent said fine screen and into said fine screen,
an outlet in the other end wall adjacent said ultra-fine screen and out of said ultra-fine screen,
a dividing wall connected to and between said fine screen and said ultra-fine screen, so that water in said inlet flows into said fine screen, and then through said fine screen out into said tank, around said dividing wall, and then through said ultra-fine screen into the outlet, and
means for rotating said screens.

13. A wastewater filtration device in accordance with claim 12 wherein said device includes a fine screen cleaning spray, said fine screen cleaning spray comprising a pipe extending spaced from but parallel to said longitudinal axis, and outside of said fine screen, with spray nozzles on said pipe directing water into said fine screen, said sprayed water flowing through said fine screen and into a trough, so that said water cleans said fine screen and debris is captured in said trough.

14. A wastewater filtration device in accordance with claim 12 wherein said device includes an ultra-fine screen cleaning spray, said ultra-fine screen cleaning spray comprising a pipe extending horizontally inside of said ultra-fine screen, with spray nozzles on said pipe directing water into said ultra-fine screen, said sprayed water flowing through said ultra-fine screen and into said tank, so that said water cleans said ultra-fine screen and debris is captured in said tank.

15. A wastewater filtration device in accordance with claim 12 wherein said screens are supported in said tank by rollers attached to said screens, each of the rollers engaging an annular flange on an end wall.

16. A wastewater filtration device in accordance with claim 12 and further including scum troughs mounted within the tank so that said water level can be periodically raised in order to remove scum from said water surface.

* * * * *